March 18, 1941.  J. V. MARTIN  2,235,378
TIRE AND WHEEL COMBINATION
Filed June 20, 1935   4 Sheets-Sheet 2
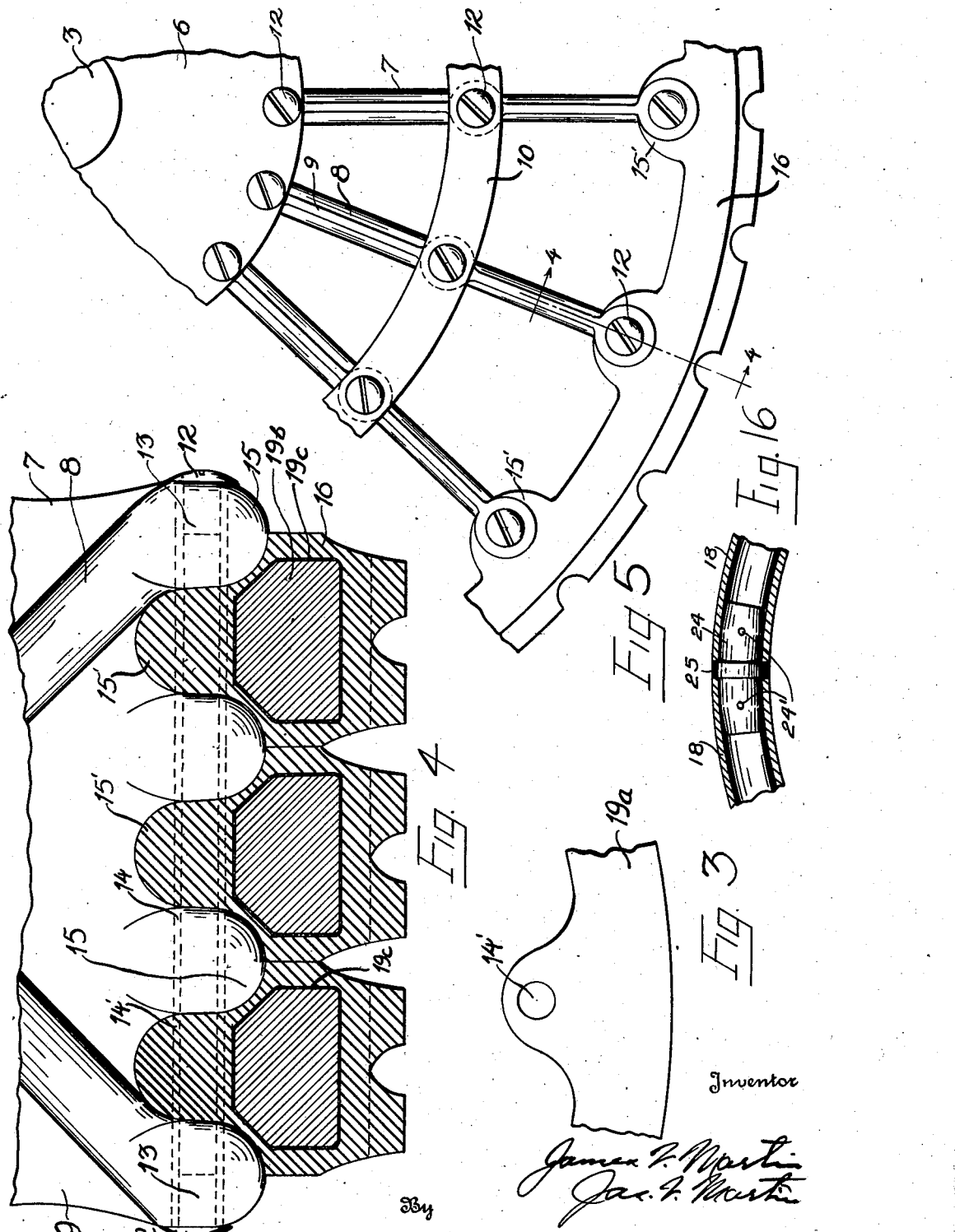

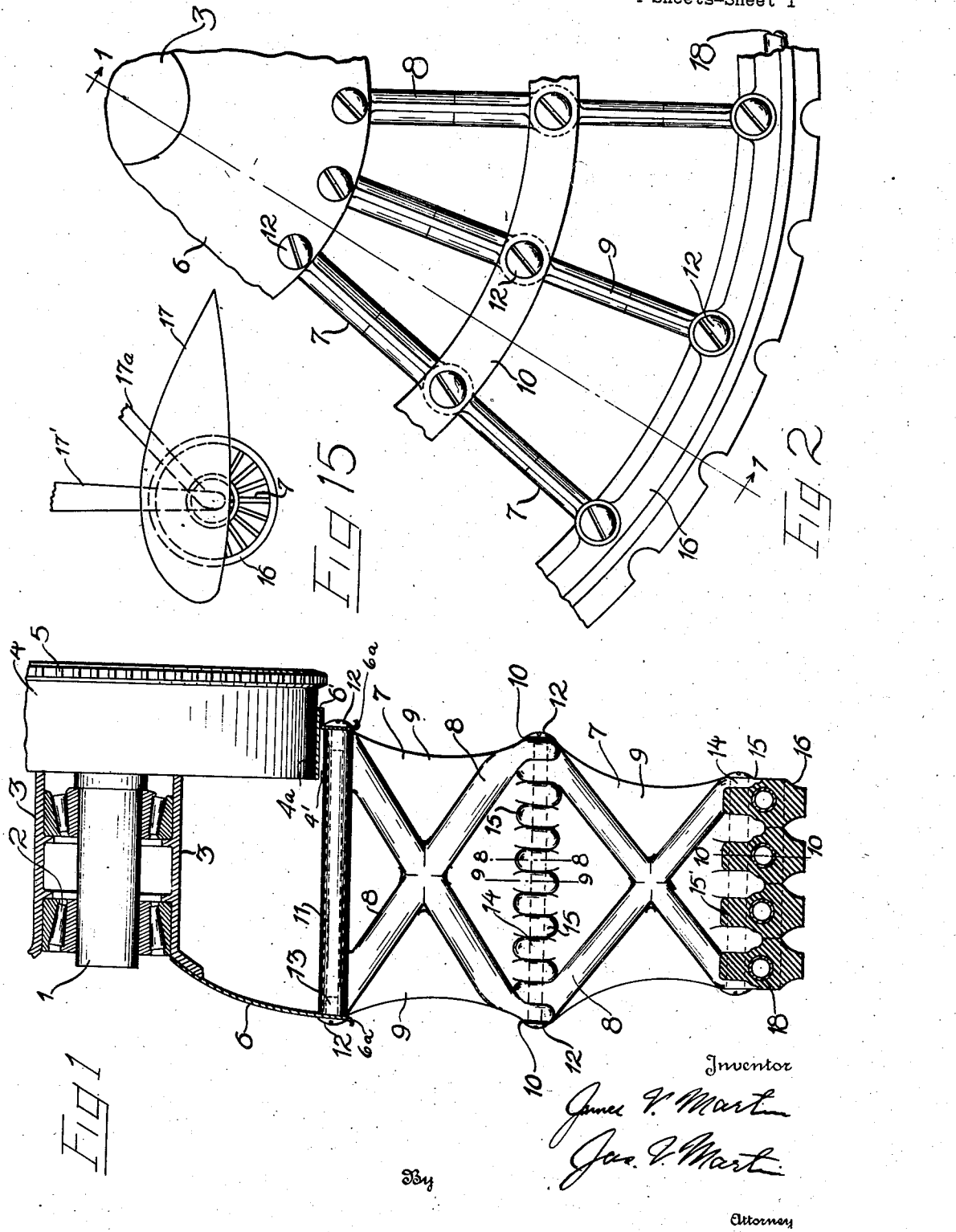

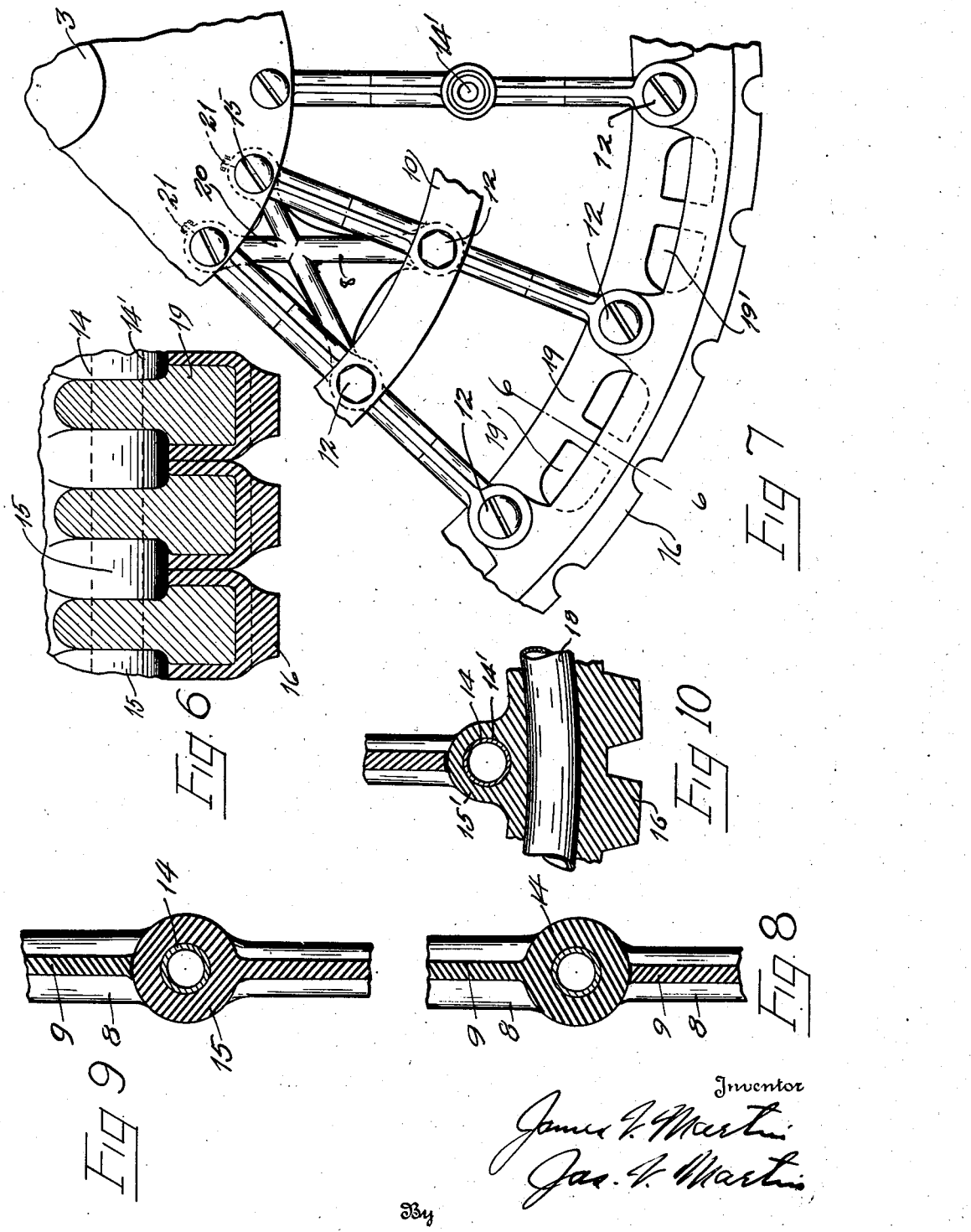

March 18, 1941. J. V. MARTIN 2,235,378
TIRE AND WHEEL COMBINATION
Filed June 20, 1935 4 Sheets-Sheet 4
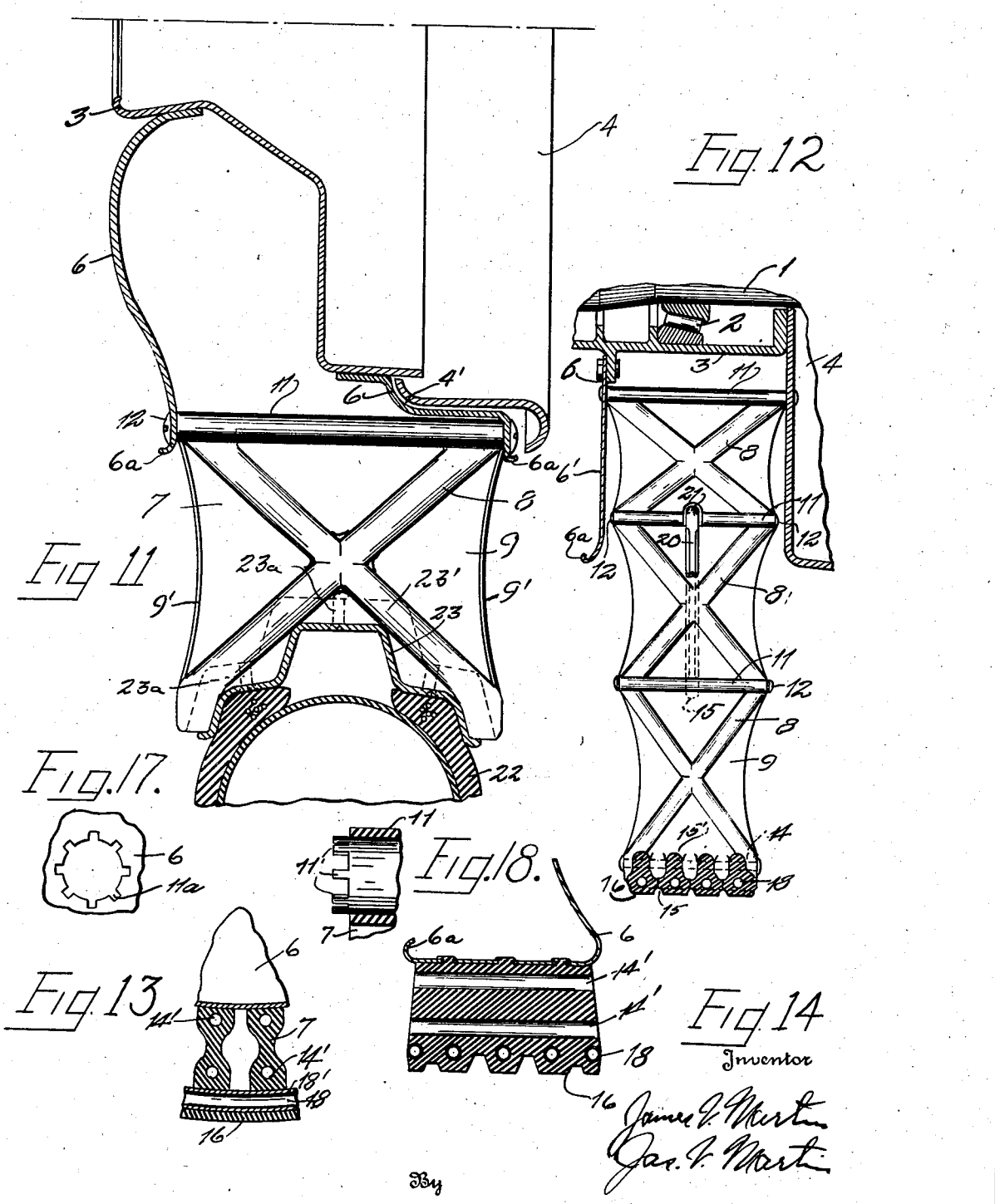

Patented Mar. 18, 1941

2,235,378

UNITED STATES PATENT OFFICE 2,235,378

TIRE AND WHEEL COMBINATION

James V. Martin, Garden City, N. Y.

Application June 20, 1935, Serial No. 27,603

30 Claims. (Cl. 152—7)

This invention relates to improvements in vehicle tires and wheels, particularly to the class of tires and wheels adapted for use on automobiles, motorcycles and aeroplanes. The primary objects of the invention are to improve the safety and riding qualities of both the tire and wheel as applied to the above and other vehicles.

Other important objects are to provide a type of tire and wheel which remains cool at high speeds, while affording a maximum of vertical cushioning and a minimum of lateral displacement when making turns or being otherwise laterally stressed.

The ancillary and additional objectives of the invention will become readily apparent from a study of the invention as herein disclosed by the drawings and accompanying description, which amplifies my former Patent No. 2,016,095 issued October 1, 1935, and my Patent No. 2,050,352 issued August 11, 1936.

The invention consists in the novel combinations and arrangements of parts as hereinafter more fully described and pointed out particularly in the claims following the specification.

In the accompanying drawings:

Fig. 1 is a sectional elevation taken on the line I—I of Fig. 2, showing a typical motorcycle hub-brakedrum and sprocket assembly equipped with my new form of shock absorbing wheel and tire; only the lower half being shown.

Fig. 2 is a segment in side elevation of the invention as seen from the non-brake side of Fig. 1.

Fig. 3 represents an alternative application to that shown in Fig. 1, while Fig. 4 shows a full scale view of the new tire in section near the tread and Fig. 5 is a side elevation segment of the alternative construction shown in Fig. 4.

Fig. 6 represents another alternative application of the invention taken on the line 6—6 of Fig. 7, as applied to the portion near the tire tread; being a portion of the tire in cross-section transversely to the plane of rotation.

Fig. 7 shows the side elevation of the form depicted by Fig. 6 and also shows an adaptation of my invention to the vehicle wheel hub portion in segment side elevation.

Figs. 8 and 9 show enlarged or full scale portions of my elastic spokes, taken on the line 8—8 and 9—9 of Fig. 1.

Fig. 10 represents a view, partly in section, taken along the lines 10—10 of Fig. 1.

Fig. 11 represents my invention as applied only to the wheel portion of a typical automobile hub-brake and air tire assembly; the view is taken transversely to the plane of wheel rotation and shows in outline the lower half of hub-brakedrum and conventional pneumatic tire and rim with my invention intervening between said rim and hub portions.

Fig. 12 is more or less diagrammatic and shows, partly in section, a cross-sectional view of the lower half of my invention as applied to an automobile hub-brakedrum assembly.

Fig. 16 is a view in section showing a sleeve connection for my tube hoops 18.

Fig. 13 is identical with a segment of Fig. 2 of my copending application Serial No. 535,778, of which the present application is a continuation in part, and Fig. 14 is identical with the lower portion of Fig. 5 of the aforesaid pending application.

Fig. 15 shows my invention within the aeroplane pants of a landing gear.

Figs. 17 and 18 show one means of preventing the elements 11 from turning.

Proceeding now, with the more detailed description, similar parts will be designated by like characters throughout the several views:

1 designates a vehicle axle or stub-axle, as the case may be; 2 represents anti-friction bearings carrying the hub 3 rotatably on the stub-axle or spindle 1. 4 represents a typical brake drum, whether one for a motorcycle as shown in Fig. 1, with a sprocket wheel 5 attached to the flared type common to automobiles as in Fig. 11, or any sort of brake drum as shown in Fig. 12.

6 designates a disk or the felly portion of a wheel and in Figs. 1 and 2, I show two sets of spokes 7, each spoke made of molded rubber and including diagonally crossed cords or ribs 8 and intermediate thinner sections called webs 9. In cases where it is desired to apply my invention only to replace a tire, the disk 6 shown in Figs. 1 and 2 and 7 should be prolonged to the position shown as rim 10, where the tube 11 can be fixed to the double disk 6 and 6' after the manner disclosed, as to location and function in my copending application Serial No. 669,008. The tread of the tire would then conform to that shown at the bottom of Fig. 1 or one of the alternatives.

I show the tubes 11 held in place by tap screws with rounded heads 12. These screws are threaded into short pieces of steel 13 pressed or welded into the locking tubes 14. The tubes 11 are vulcanized into and become an integral part of a spoke as for example the upper spoke shown in Fig. 1 or any of the upper cross tubes shown in Fig. 12, but the locking tubes 14 are separate from the rubber tongues or lugs 15 which form a mortise and tenon joint for the purpose of silently and flexibly locking one spoke to the other as in Fig. 1 between the spokes 7, or for inter-locking the tread portion 16 to the spoke 7, see also Fig. 4.

The intermediate rim 10 may be rigidly connected in any desired manner between the spokes from one tire face to the other and this rim may be made practically rigid, as for example the conventional rim 23 shown in Fig. 11. Where the spoke in question is locked or otherwise attached to the tire tread portion, it is properly referred to as a tire spoke, but where as in Figs. 1, 2, 5, 7, 11 and 12, the outer edge of the spoke terminates in an intermediate rim such, for example, as 10, then the proper denomination for such spoke is a wheel-spoke.

The function of these spokes when used as wheel spokes is to furnish a shock-absorbing wheel, and they can thus function when intermediately disposed between a wheel disk and one of my type tires, as shown in Figs. 1, 2 and 5 or combined with a conventional tire and rim as in Fig. 11, or a compound shock-absorbing wheel and tire like that shown in Fig. 12 can be had. The spokes also serve to rotate an aeroplane wheel in the air, by having their paddle wheel character exposed to the air and their upper portion enclosed within the conventional "pants" 17 of an aeroplane landing gear as illustrated in Fig. 15. Also by combining my elastic spoke type tire with one or more elastic spoke rows in the wheel, the aeroplane landing gear may be simplified by eliminating the cumbersome shock-absorber and using rigid struts 17' and 17ª.

The tread portion 16 is made up of high tensile steel tube hoops 18, either partially or entirely enclosed and cured within rubber; this rubber extends around the tubes on both sides and forms a ring or lug 15' which has a hole 14' through which the locking tubes 14 may form a locking means with the spoke tongues 15. As an alternative, to the steel tube hoops, I show in Figs. 6 and 7 wooden hoops 19, preferably made of steam bent hickory and having lightening holes 19' and holes 14' to accommodate the locking tube 14. If more flexibility is desired in the hoops, then the style of hoop 19ª shown in Figs. 3, 4 and 5 should be used, in which the rubber tongue 15' is formed above the fibrilose filler 19ᵇ where the filler is tapered on its inner circle, as shown in Fig. 4, to make room for the tongue and lug connections the wood is carried up at intervals to make a place for the locking holes 14'.

The alternative shown in Figs. 3, 4 and 5 discloses a hickory rim 19ᵇ takes the place of two steel tube hoops and also has a fabric 19ᶜ tightly wrapped around it and cemented to it to form a base for a good bond with the rubber tread. It should be noted that where the spoke tongues 15 encroach (Fig. 4) on the dimensions of the rubber lugs 15', the strength of these is made up in the other plane as shown at 15' in Fig. 5.

In Fig. 7 I show a radially disposed spoke designed and placed to absorb the drive and/or brake torque of the wheel. Two or three of these should suffice in each row of wheel spokes, and if found desirable two or three such spokes can be inserted in the tire row of spokes. It will be noticed that the tongues 15 are split at 21 so that they can envelop the tubes 11 or locking tubes 14.

If steel tubes are used for hoops, they may be exposed to the air as at 18 in Fig. 14 and also on their insides between the spokes as at 18' in Fig. 5. 13, and the holes 14' can be used either for the locking tubes 14 or for flexibility and uniformity of the rubber tongues.

In Fig. 11 I show my invention as applied to the wheel only and intervening between a conventional tire 22 and rim 23. A stiffener 23', after the fashion shown in my former Patent No. 2,050,352, follows the inside of the rim 23 and affords a means of uniting the spoke 7 thereto by means of the screws 23a. Obviously it will not be necessary to use a drop-center rim such as shown as a clincher or other type would serve as well. Any or all of my spokes may have a bead 9' as shown in Fig. 11 to strengthen the rubber web 9 at its margins. The hub and brake drum 20 as well as the rim and tire herein shown are closely proportioned to those in use on well known types of automobiles of 1930-1932.

In practice I recommend that my spokes be given an initial tension equal to approximately the lowering of the wheel center or axle due to the application of the static load. Then the lower spokes will not have a buckled appearance normally but will readily buckle with the jars or jolts of the road, which is contemplated. This type of wheel and tire is designed to take all the load in tension from the axle to the upper part of the hoops through the spokes 7 and the web-like shape of each spoke with its diminished center dimension tends to make the spokes buckle at their centers under compression.

It will be noticed that as the leverage increases I increase the dimensions of my spokes 7, see Fig. 1. Thus in Fig. 12 the diagonals 8 of the tire spokes are of less cross-section than those of the next row of wheel spokes and also the row of spokes nearest the hub is of greatest size. Also the width of the spokes can be greater and the ends of the ribs farther apart on the part of the spoke nearest to the wheel, thus bringing into play the cantilever principle for lateral strength. Also the angles of these diagonals 8 progressively approach the horizontal as they are found in rows from the tread toward the hub. This is for the purpose of providing lateral strength to overcome the inch pounds of lateral stress. In addition to this I provide another means of checking lateral wheel displacement by continuing the wheel disc 6 down below the first spoke tube 11. This extension is marked 6' on Fig. 12, and the brake drum extends in a similar relationship on the opposite side of the wheel, leaving a slight clearance between the screw caps 12 and such extension, the purpose being that in cases of extreme lateral pressure, as for example stresses imposed by making violent turn in an automobile, the caps 12 will engage the disc 6' or drum 4 and thus be prevented from moving too far laterally. The cords are filleted where they intersect each other.

I find in practice that the location of rubber between the hoops combined with the flexible tongue and groove method of locking the spokes to the tread portion permits the tread portion 16 to conform to the inequalities of the road, thus furnishing a flexible and constant large area of support. The air can reach practically all parts of my tire for cooling. The separate hoops and spokes provide immunity from danger if several are destroyed and damp out bouncing on the road as well as provide the maximum in riding comfort. Obviously wide variations can be had without departing from my teaching and I do not limit the invention to the precise forms shown.

The lower edges of the discs 6 should be curved as at 6a to prevent injury to the spokes in extreme movements. Brakes get very hot and unless either air spaces such as I provide at 4' of Fig. 11 or asbestos 4a of Fig. 1 are provided the rubber spokes may be injured.

In Figs. 17 and 18 I show one means of preventing the tubes 11 from turning in the disc holes; prolongations of the tube wall 11' in Fig. 18 fit into corresponding indentures 11a of disc 6, see Fig. 17, and with this or an alternative means of preventing turning the flexible spoke movement will be confined to molecular movement of the rubber.

Fig. 16 shows a tube sleeve or plug 24 fitted into the ends of the steel tubes hoops; a collar 25 can separate the hoops or the plug may be pinned to the hoop tubes at 24' in which case the hoop ends can abut each other. It is best to chamfer the ends of the plug 24 so that in constant flexing there is no injury to the inside wall of the tubes 18.

What I claim is:

1. The combination of a shock absorbing wheel provided with elastic spokes, a tire also provided with elastic spokes and each set of said spokes including diagonally crossed means to resist lateral stresses, the inner of said sets having the said means set at a greater angle to the vertical than the outer of said sets.

2. In a tire a tread and elastic spokes provided with multiple separate elastic loops, multiple loops of the said tread interposed between the first said loops and means for clamping and holding said loops together.

3. In combination with a vehicle wheel and rim, a tire with a tread portion including separate multiple hoops carrying the vehicle load through yieldable tension spokes and combined with a rubber tread forming the outer face of the said tread portion, the said face being substantially flat and the outer edge of each spoke uniting with lugs of the said tread portion, each said spoke having diagonally crossed ribs to resist lateral movement of the said tire.

4. In an elastic spoke type tire a tread including three or more separate tread units and each said spoke secured by interlocking elastic connections to all of the said tread units, each of said tread units including a hoop located within flexible material.

5. In combination with a tire having elastic spokes united with a tread portion including multiple hoops, rubber loops from each of said spokes, a rubber loop attaching each said hoops to a loop of one of said spokes and uniting with the tread rubber around said hoops, the end loops of each spoke being held in alignment by internal sleeves.

6. In combination with an elastic spoke type wheel and tire, elastic means including diagonally crossed ribs integral with each said spoke to resist lateral displacement between wheel hub and tire tread and means to limit the amount of movement of said first means.

7. In combination with an elastic spoke type tire, separate hoops composing a tread portion of said tire, each said hoop surrounded by flexible material and said material held by a locking bar in flexible contact with the like material of the adjacent hoop.

8. A combination according to claim 7 and the said material of each said hoop forming a union with an elastic projection of each said spoke.

9. A vehicle wheel and a tire including a tire tread portion having inwardly extending lugs, said tire also provided with elastic spokes and each said spoke having a plurality of tongues and means of interlocking the tongues of each spoke to some of the said tread lugs.

10. A tire tread and elastic spoke combination including mortise and tenon interlocking joints therebetween.

11. A vehicle wheel and tire, and tire tread, an inner and an outer row of elastic spokes providing the principal lateral aligning means between the said hub and tread, and an intermediate rim attached to the outer part of each inner spoke at substantially the same line of its attachment to the inner part of each outer spoke.

12. In combination with a wheel and a tire tread, two rows of elastic spokes, one row lying inwardly toward the wheel center of the second row, all of said spokes having diagonally crossed ribs to resist lateral tire displacement relative the said wheel and the first said row spokes having larger ribs than said second row spokes.

13. A vehicle wheel and tire combination including an inner row of elastic spokes termed wheel spokes and an outer row termed tire spokes, each spoke of said inner row uniting with one of the spokes of said outer row and provided with diagonal bracing to resist lateral stresses.

14. A combination according to claim 13 and each spoke of the tire row provided with similar bracing of smaller size and less vertical angle than the bracing of the said wheel spokes.

15. The combination of a vehicle wheel and tire including elastic spokes carrying the said wheel from the upper part of fibrillose hoops, each of the said hoops covered by a rubber envelope, lugs on the wheel side of said envelope, means to unite each said lug with one of the said spokes and means to bind the said envelope tightly to the said fibrillose hoop.

16. The combination of a vehicle wheel and tire tread with multiple wooden hoops and elastic spokes; the said hoops cured within rubber to form the tread and carrying the wheel through the said spokes from the upper part of the said tread and the inner circle of said hoops tapered to a smaller cross-section than their outer part.

17. The combination with an elastic spoke type wire, wooden hoops each separately covered with a rubber tread envelope and flexibly united to the spokes of the said tire through the said envelope.

18. The combination with a semi-flexible tire tread of three or more fibrillose hoops located within the said tread and each surrounded by its own separate rubber envelope.

19. In a tire a rubber tread portion comprising separate molded hoops and each said hoop provided with a fibrillose core.

20. A tire combination including separately molded semi-flexible hoops comprising a tread portion and elastic web-like spokes having diagonally crossed ribs located inwardly of beaded lateral edges.

21. A vehicle wheel and a tire including a tread portion, the tire including elastic spokes carrying the said wheel's loads to the upper half of the said tread portion and each said spoke provided with a plurality of lugs adjacent the said tread portion, lugs of the said tread portion intervening between the first said lugs and means to clamp all of said lugs together whereby they will not surge upon each other.

22. In combination with a wheel, a tire including a tread portion spaced apart from the said wheel by elastic web-like spokes placed at right angles to the plane of tire rotation, each said spoke under an initial tension and having cured within its inner side a metal brace, multiple elastic lugs on the opposite side of each said spoke and means of attaching the said metal brace to the said wheel and the said lugs to the said tread portion.

23. The combination of a wheel and a tire having a tread portion and elastic inner and outer web-like spokes separating both the said wheel and the said tread portion from an intervening rim, each inner spoke being in the radial plane of each outer spoke and transverse to the plane of the wheel rotation and one or more web-like spokes intervening between two of the said inner spokes and located with its web in the rotational plane of the said wheel, whereby to absorb the brake torque thereof.

24. In combination with a wheel and tire wherein the tire carries the wheel yieldably through rubber spokes from the upper portion of separately molded tread hoops, each spoke including diagonally crossed ribs located within lateral beaded margins of the said spoke.

25. A combination according to claim 24 and a mortise and tenon union between the said tread hoops and the outer margins of each of the said spokes, whereby a spoke portion lies outwardly of the outermost tread portion of the said union.

26. The combination with a vehicle tire and wheel rim, a tire tread portion, elastic spokes forming the principal weight carrying connection between said tread portion and rim, each said spoke provided with diagonally crossed ribs for lateral strength of the said tire and being of less lateral width at its outer than at its inner connection.

27. In combination with a wheel and tire, a tire tread portion carrying the wheel load through two rows, an inner and an outer row, of elastic web spokes, diagonal ribs for lateral strength on each of said spokes and the ribs of the said inner row placed at a greater angle to the vertical than the ribs of the said outer row and also of greater cross sectional dimensions.

28. In combination with an elastic spoke type tire a rubber spoke including diagonally crossed ribs for lateral strength of the said tire and the inner ends of the said ribs spaced further apart than the outer ends thereof whereby the outer end of the said spoke may be made smaller for clearance, while permitting better lateral angles for the said ribs.

29. A vehicle tire including a tread portion and elastic spokes carrying the axle load to the upper semi-circle of the said tread portion and the said portion comprising two or more separately molded hoops joined to each other by means of elastic extensions interlocking with portions of the said spokes.

30. A combination according to claim 29 and each said spoke provided with means to resist lateral displacement between the said vehicle and the said tread portion.

JAMES V. MARTIN.